United States Patent [19]

Lewis

[11] 4,154,385

[45] May 15, 1979

[54] SINGLE FILAMENT FIBER OPTIC CABLE PARTING TOOL

[75] Inventor: Adolph L. Lewis, La Mesa, Calif.

[73] Assignee: The United States of America as represented by the Secretary of the Navy, Washington, D.C.

[21] Appl. No.: 859,637

[22] Filed: Dec. 12, 1977

[51] Int. Cl.² ............................................. B26F 3/00
[52] U.S. Cl. ...................................... 225/96.5; 225/2
[58] Field of Search ........................... 225/96.5, 96, 2

[56] References Cited

U.S. PATENT DOCUMENTS

| | | | |
|---|---|---|---|
| 3,934,773 | 1/1976 | Chinnock et al. | 225/2 |
| 4,017,013 | 4/1977 | Hawk et al. | 225/96.5 |
| 4,036,419 | 7/1977 | Hensel et al. | 225/96.5 |

Primary Examiner—Frank T. Yost

Attorney, Agent, or Firm—R. S. Sciascia; G. J. Rubens; J. W. McLaren

[57] ABSTRACT

A hand-held, manually operative tool is designed for severing single filament, fiber optic cable. The exertion of a squeeze-like pressure on the handles of the tool cause the fiber optic cable to be gripped firmly and positioned on an anvil member where it may be scored by a sharpened hard element such as a diamond point, for example, at a selectively determined point along the axis of the fiber optic cable. Further actuation of the tool causes the gripping members to be pivoted away from each other thus parting the fiber optic cable at the selectively determined point. The coacting members of the tool are spring loaded for return to their normal unactuated state and the anvil member is preferably a curved surface so as to retain the fiber optic cable in a desired disposition during the scoring operation.

8 Claims, 4 Drawing Figures

SINGLE FILAMENT FIBER OPTIC CABLE PARTING TOOL

BACKGROUND OF THE INVENTION

The recent development of low loss high quality fiber optic cable greatly enlarges the feasibility of many optical systems employed for communication data processing and other types of signal transmission.

Some of the advantages of fiber optic cables used in such systems include their greatly reduced size, weight, and cost, as well as, reduced constraints related to impedance matching and the comparitively easy coupling to common logic circuitry by the use of various light sources and light detectors. Additionally, fiber optic cables permit high channel-to-channel isolation, easy changeability with electrical cable, and greatly reduced electromagnetic interference.

One of the principal advantages of fiber optic cables in military use is their virtue immunity to radio frequency signals and their characteristic containment of transmitted signals wholly within the cables. In ground communication systems, this greatly increases transmission security as well as eliminating cross-talk.

In all such optical systems employing fiber optic cable, there is a need for fiber optic cable terminals which, when connected, are capable of intercepting and extracting signal information from an optical path as well as introducing additional signal information into the optical path.

Characteristically, such terminal ends of fiber optic cable will transmit light energy signals at the terminal end with greatest efficiency when the terminal end itself is optically flat. In the case of multi-filament fiber optic cables, a number of different methods have been employed for bonding the fiber optic cable end together and then grinding and polishing the fiber optic terminal end substantially optically flat.

However, the more conventional grinding and polishing techniques are not ideally adapted to single filament fiber optic cable and inherently entail the further disadvantage of the probability of some degree of contamination by lossy residues left from the grinding and polishing operation.

It has been observed that glass fibers, particularly of the single filament fiber optic cable type, can be made to break with flat and perpendicular end surfaces. In addition to being faster and simpler, the breaking technique has the added advantage of producing clean, uncontaminated end surfaces.

Accordingly, there is a need for a hand-held, manually operative tool for parting single filament fiber optic cable at a determinable location by employing the breaking technique.

SUMMARY OF THE INVENTION

The concept of the present invention contemplates a parting tool for single filament fiber optic cable which is hand-held and manually operative. In its operation, the tool grips the single filament fiber optic cable firmly between gripping members, positioning the fiber optic cable over a slightly elevated curved surface anvil member where it may be scored at a selectively determined point by a suitable means, such as a diamond point resiliently supported from the top of the anvil member.

Upon further actuation, the gripping members are caused to be pivotally displaced from each other placing axial stress on the fiber optic cable and causing it to sever at the selectively determined point where it had been previously scored.

Desirably, the operation of the parting tool of the present invention produces a substantially flat and perpendicular end face of the single filament in the fiber optic cable which is clean and uncontaminated by residues such as may remain if the more conventional grinding and polishing techniques had been employed.

The parting tool for severing filament fiber optic cable as conceived by the present invention comprises first and second members which are movably attached at a common pivot point, each having first and second respective internal recesses which are contiguously aligned and extend radially from the pivot point.

An anvil member which is configured and dimensioned to be slidably supported in the internal recesses, provides an anvil face upon which the single filament fiber optic cable may be positioned. In the preferred embodiment of the present invention, the anvil face is configured with a slight curvature for reasons which will be better understood from the full explanation of the disclosure which follows.

Means for scoring the single filament fiber optic cable, such as a diamond pointed element, is supported from the top of the anvil member for being drawn across the filament fiber optic cable at a selectively determined point orthogonally related to the principal axis of the fiber optic cable.

First and second opposed lever members are attached to the first and second members described hereinabove by pins extending through upper and lower pairs of slots in the first and second members for permitting inward and upward movement of the lever members relative to the anvil member.

First and second upper gripping surfaces extend from the first and second members, respectively, and engage one side of the single filament fiber optic cable. First and second lower gripping surfaces extend from the first and second lever members and are disposed to engage the first and second upper gripping surfaces for frictionally gripping opposite sides of the single filament fiber optic cable upon upward movement of the lever members responsive to initial manual actuation of the lever members toward each other. In a preferred embodiment the gripping surfaces are preferably of a high friction resilient type such as rubber, for example.

The coacting members of the parting tool of the present invention are so designed to cooperate with each other that further manual actuation of the lever members toward each other causes coordinated opposed pivotal movement of the first and second members, together with the first and second lever members, thereby exerting opposite stresses on the fiber optic cable and causing it to part at the previously scored selectively determined point.

Accordingly, it is a primary object of the present invention to provide a hand-held, manually actuated parting tool for efficiently severing single filament fiber optic cable.

Another most important object of the present invention is to provide a parting tool for severing single filament fiber optic cable which will operate to produce a substantially flat clean terminal end of the cable.

A further object of the present invention is to provide such a parting tool which is particularly adapted to sever single filament fiber optic cable and provides the selective determination of the point at which such fiber optic cable is parted and severed.

Yet a further object of the present invention is to provide such a parting tool for severing single filament fiber optic cable which will function effectively and efficiently without shattering the brittle material of which the fiber optic cable is comprised.

An underlying object of the present invention is to provide a parting tool for efficiently severing single filament fiber optic cable which will avoid the more conventional grinding and polishing techniques and the disadvantages which are inherent in such prior art techniques.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENT

Figure 1:
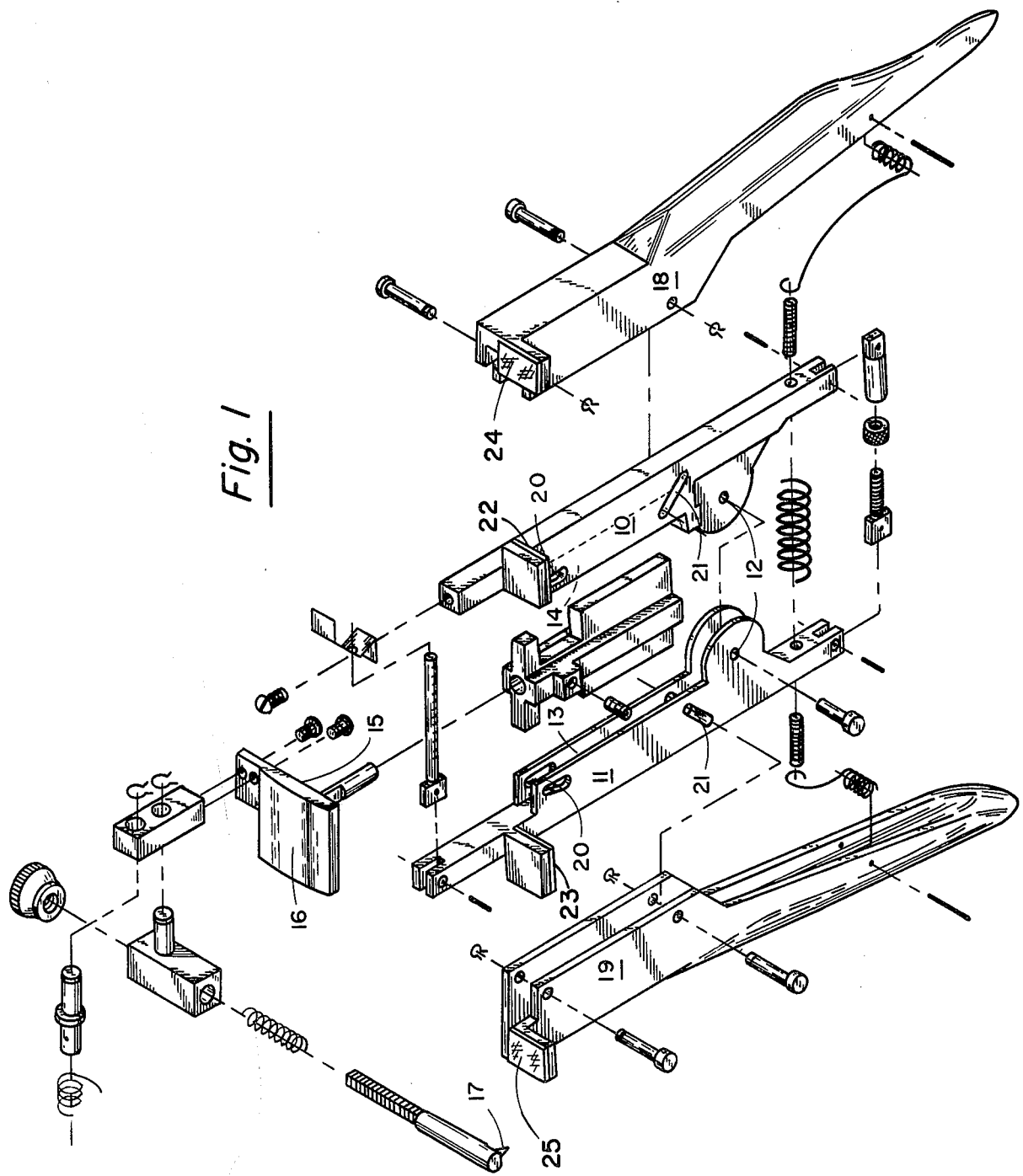
FIG. 1 is an exploded perspective view of the preferred embodiment of the present invention.

As is best shown in an exploded view of the preferred embodiment illustrated in FIG. 1, the concept of the present invention contemplates a parting tool for severing single filament fiber optic cable which comprises first and second members 10 and 11, respectively, which are adapted to be movably attached at a common pivot point 12. As is shown by the dash line, the first and second members 10 and 11 have first and second internal recesses 13 and 14 which are configured to be contiguously aligned and extend radially from the pivot point 12 when the tool is in its assembled state.

An anvil member 15 has a lower portion which is configured and dimensioned to be slidably supported in the internal recesses 13 and 14 and has an anvil face 16 upon which the single filament fiber optic cable may be conveniently positioned. As is shown in FIG. 1, the anvil face 16 preferably has a slight curvature, the reason for which will be more fully understood hereinafter by explanation and illustration of the operation of the present invention.

A means for scoring the fiber optic cable, such as a diamond point shown at 17 is preferably resiliently supported for being drawn across the anvil face to score the single filament of the fiber optic cable at a selectively determinable point.

First and second opposed lever members 18 and 19 are adapted to be attached to the first and second members 10 and 11, respectively, by pins extending through upper and lower pairs of slots 20 and 21, respectively, in the first and second members 10 and 11. This permits both inward and upward movement of the lever members 18 and 19 relative to the anvil member 15.

First and second upper resilient gripping surfaces 22 and 23 extend from the first and second members 10 and 11, respectively, and are configured and dimensioned each to engage one side axis of the signel filament fiber optic cable. First and second lower resilient gripping surfaces 24 and 25 extend from lever members 18 and 19, respectively, and are configured and disposed to engage the first and second upper gripping surfaces 22 and 23 for frictionally engaging opposite sides of the single filament fiber optic cable upon the upward movement of the lever members 18 and 19 responsive to initial actuation of the lever members toward each other.

OPERATION

Figure 2:
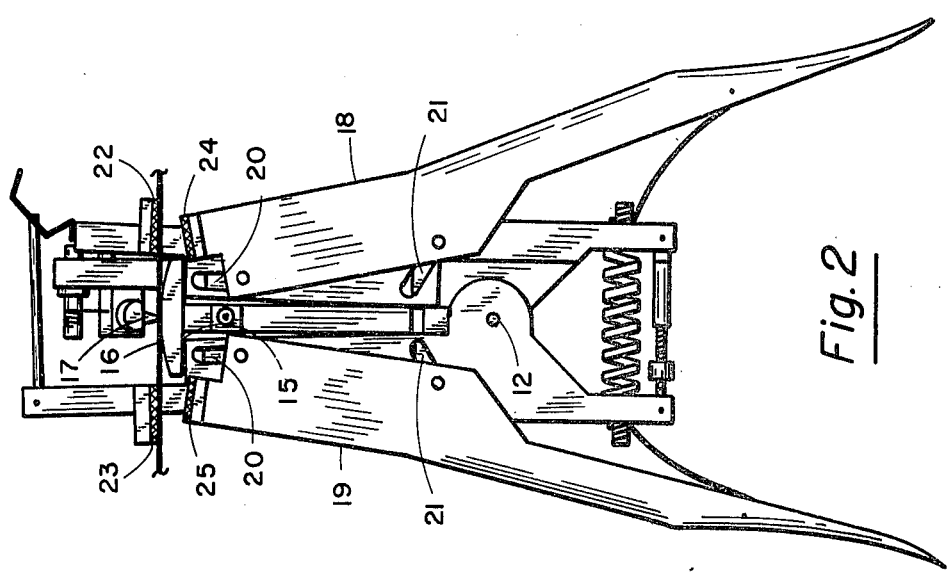
FIG. 2 is a front view of the assembled preferred embodiment of the present invention in its normal unactuated state.
Figure 3:
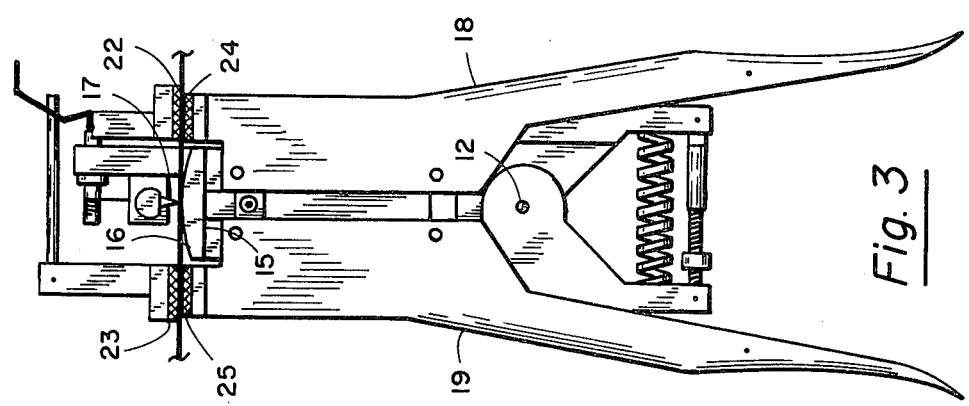
FIG. 3 is a front view of the preferred embodiment in its initial stage of actuation; and, FIG. 4 is a front view of the preferred embodiment of the present invention in its final stage of actuation.
Figure 4:
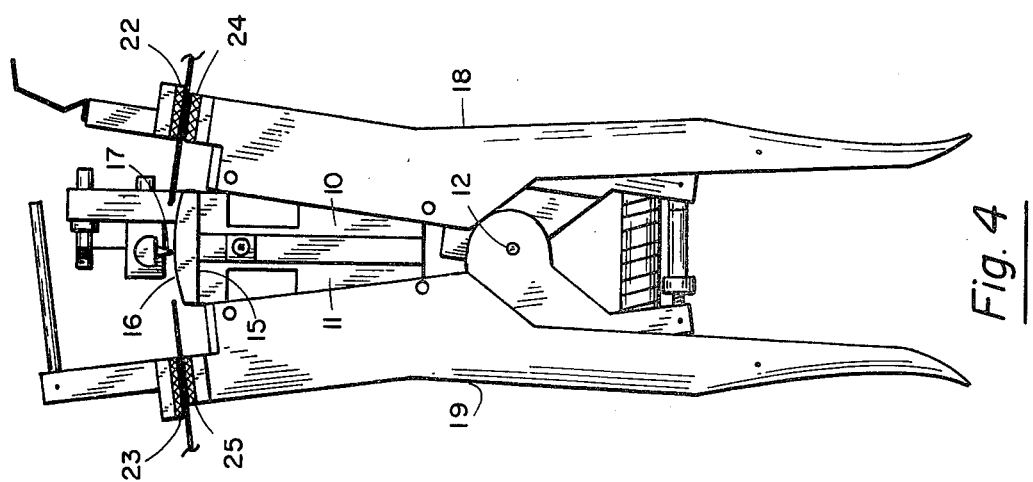

The operation of the present invention may be best understood from FIGS. 2, 3, and 4 which illustrate the three principal stages of its manual actuation. In the illustrations of FIGS. 2, 3, and 4 like parts and elements have the same numerical designations as in the illustration of FIG. 1. As shown in FIG. 2, initially a single filament fiber optic cable is positioned to lie upon the anvil face 16 and extend between the upper gripping surfaces 22 and 23 and the lower gripping surfaces 24 and 25.

The initial actuation of the tool of the present invention is achieved by manually compressing the first and second lever members 18 and 19 toward each other as illustrated in FIG. 3. Because of the configuration of the upper and lower slots 20 and 21 (as most clearly illustrated in FIG. 1) and the pins extend therethrough, the first and second opposed lever members 19 are caused to move inwardly and upwardly relative to the anvil member 15 which is retained within its position by the internal recesses 13 and 14 in the first and second members 10 and 11.

The upward movement of the first and second opposed lever members 18 and 19 causes the first and second lower resilient gripping surfaces 24 and 25 to engage the first and second upper gripping upper surfaces 22 and 23, respectively, thereby frictionally gripping opposite sides of the single filament fiber optic cable, since the first and second members 10 and 11 remain stationary.

In a preferred embodiment of the present invention, the two pairs of slots 20 and 21 are desirably so configured, relative to the shape and disposition of the anvil member 15, that upon the initial actuation of the tool achieved through the drawing together of first and second lever members 18 and 19, the anvil member 15 and anvil face 16 will be slightly elevated in its final position relative to the upper gripping surfaces 22 and 23 in their engaged position with the lower gripping surfaces 24 and 25, thereby ensuring that the single filament fiber optic cable is stretched taut across the anvil face 16.

In the next stage of operation, the cutting element, such as a diamond point 17, is drawn across the single filament of fiber optic cable at right angles to its principal axis, scoring the single filament at a selectively determined point where it is desired to sever the cable.

In the final stage of actuation as illustrated in FIG. 4, the tool of the present invention is shown with the first and second opposed levers 18 and 19 fully compressed toward each other which causes coordinated opposed pivotal movement of the first and second members together with the first and second lever members due to the fact that the pins within the pairs of slots 20 and 21 have reached a maximum excursion and the entire assembly is therefore forced to pivot about the pivot point 12. This final actuation causes the fiber optic cable to be severed producing a substantially flat clean terminal end.

Those knowledgeable and skilled in the pertinent art will readily realize that the advantages of the present invention include the desirable aspects of its being small, compact, relatively inexpensive, and afford hand-held, manual use at any point in an optical communication system employing fiber optic cables where it is desired to sever a single filament fiber optic cable in order to provide terminal ends for coupling light energy signals in or out of such optical systems, multiplexing, interconnection with electro-optical transducers, etc.

The more conventional prior art techniques of grinding and polishing fiber optic cable ends had the inherent disadvantage of introducing a certain amount of residue into the area of fiber optic end which caused undesirable light losses and decreased efficiency of light signal transmission.

Additionally, prior art techniques for parting and severing fiber optic cables, as previously carried out under laboratory conditions, involved relatively bulky and massive tools for gripping and severing the fiber optic cable. Obviously such tools are not readily portable and therefore not available for intercepting fiber optic cable as may be desired at any point in an optical system in an aircraft or military vessel, for example.

Obviously many other modifications and variations of the present invention are possible in the light of the above teachings. It is therefore to be understood that within the scope of the appended claims the invention may be practiced otherwise than as specifically described.

I claim:

1. A single filament fiber optic cable parting tool comprising:
   first and second members movably attached at a common pivot point;
   first and second internal recesses contiguously aligned in said first and second members, respectively, and extending radially from said pivot point;
   an anvil member configured and dimensioned to be slidably supported in said internal recesses and having an anvil face for positioning said single filament fiber optic cable thereon;
   a cutting edge resiliently supported for being drawn across said anvil face to score said single filament fiber optic cable at a selectively determined point;
   first and second opposed lever members attached to said first and second members, respectively, by pins extending through upper and lower pairs of slots in said first and second members for permitting inward and upward movement of said lever members relative to said anvil member;
   first and second upper gripping surfaces extending from said first and second members, respectively; and
   first and second lower gripping surfaces extending from said first and second lever members, and disposed to engage said first and second upper gripping surfaces for frictionally gripping opposite sides of said single filament fiber optic cable upon the upward movement of said lever members responsive to initial actuation of said lever members toward each other;
   whereby further actuation of said lever members toward each other causes coordinated opposed pivotal movement of first and second members with said first and second lever members, exerting opposite stresses on said fiber optic cable and parting it at said selectively determined point.

2. A single filament fiber optic cable parting tool as claimed in claim 1 wherein said first and second members are spring loaded for urging said internal recesses toward each other.

3. A single filament fiber optic cable parting tool as claimed in claim 1 wherein said first and second opposed lever members are spring loaded relative to said first and second member, respectively, for urging said lever members toward their lowermost position.

4. A single filament fiber optic cable parting tool as claimed in claim 1 wherein said gripping surfaces are faced with high friction resilient material.

5. A single filament fiber optic cable parting tool as claimed in claim 1 wherein said cutting edge is a diamond point.

6. A single filament fiber optic cable parting tool as claimed in claim 5 wherein said diamond point is spring loaded for being manually drawn across the principal axis of the fiber optic cable to score said fiber optic cable.

7. A single filament fiber optic cable parting tool as claimed in claim 1 wherein the upper portions of said slots are configured and dimensioned to cause a slight upward movement of said anvil upon full actuation of said lever members toward each other.

8. A single filament fiber optic cable tool as claimed in claim 1 wherein said anvil has a curved face surface.

* * * * *